(12) United States Patent
Kim et al.

(10) Patent No.: US 7,855,951 B2
(45) Date of Patent: Dec. 21, 2010

(54) SIGNAL TRANSMISSION SCHEME FOR EFFICIENT MANAGEMENT OF COMMON ENHANCED DEDICATED CHANNEL

(75) Inventors: Sun Hee Kim, Anyang-Si (KR); Seung June Yi, Anyang-Si (KR); Sung Duck Chun, Anyang-Si (KR); Sung Jun Park, Anyang-Si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 12/695,785

(22) Filed: Jan. 28, 2010

(65) Prior Publication Data

US 2010/0188969 A1 Jul. 29, 2010

Related U.S. Application Data (60) Provisional application No. 61/148,370, filed on Jan. 29, 2009, provisional application No. 61/149,007, filed on Feb. 1, 2009, provisional application No. 61/149,313, filed on Feb. 2, 2009, provisional application No. 61/151,196, filed on Feb. 10, 2009, provisional application No. 61/151,510, filed on Feb. 11, 2009.

(30) Foreign Application Priority Data

Nov. 27, 2009 (KR) .................. 10-2009-0115861

(51) Int. Cl.
G06F 11/00 (2006.01)
(52) U.S. Cl. ...................................... 370/216; 370/329

(58) Field of Classification Search ................. 370/216, 370/230, 235, 236, 242, 244, 252, 328, 329, 370/395.4, 412, 447, 450, 459
See application file for complete search history.

(56) References Cited

U.S. PATENT DOCUMENTS

2008/0045255 A1 2/2008 Revel et al.

(Continued)

FOREIGN PATENT DOCUMENTS

EP 1883190 A1 1/2008

(Continued)

OTHER PUBLICATIONS

3GPP TSG-RAN2 Meeting #60 R2-074812, "Clarification of TEBS and HLBS in Scheduling Information for TDD Mode", Nov. 5-9, 2007.

*Primary Examiner*—Brian D Nguyen
(74) *Attorney, Agent, or Firm*—Birch, Stewart, Kolasch & Birch, LLP (57) ABSTRACT

A signal transmission scheme for efficient management of a common E-DCH is provided. In the case of a common E-DCH that a UE in an idle mode or in a CELL_FACH status uses within a limited period of time, the UE may notify a Node B of release of radio resources of the common E-DCH using scheduling information including TEBS=0 within the period of time when the UE has completed data transmission. It is possible to prevent unnecessary waste of resources and unnecessary battery consumption of the UE by taking into consideration the above circumstances when triggering new scheduling information since HARQ transmission of the scheduling information has failed.

14 Claims, 9 Drawing Sheets

U.S. PATENT DOCUMENTS

| | | |
|---|---|---|
| 2008/0305819 A1 | 12/2008 | Chun et al. |
| 2010/0005355 A1* | 1/2010 | Niu et al. .................... 714/749 |
| 2010/0146354 A1* | 6/2010 | Zhang et al. ................ 714/749 |
| 2010/0153806 A1* | 6/2010 | Yu et al. ..................... 714/749 |
| 2010/0166103 A1* | 7/2010 | Harel et al. ................. 375/295 |
| 2010/0185910 A1* | 7/2010 | Lee et al. .................... 714/748 |

FOREIGN PATENT DOCUMENTS

| | | |
|---|---|---|
| JP | 2007-51157 | 3/2007 |
| KR | 10-2006-0091559 A | 8/2006 |
| KR | 10-2007-0076374 A | 7/2007 |
| KR | 10-2007-0078331 A | 7/2007 |
| KR | 10-2008-0082888 A | 9/2008 |
| WO | WO 2007/129645 A1 | 11/2007 |

\* cited by examiner

| UPH (5bits) | TEBS (5bits) | HLBS (4bits) | HLID (4bits) |

SIGNAL TRANSMISSION SCHEME FOR EFFICIENT MANAGEMENT OF COMMON ENHANCED DEDICATED CHANNEL

CROSS REFERENCE TO RELATED APPLICATIONS

This application claims the benefit of U.S. Provisional Application Nos. 61/148,370, 61/149,007, 61/149,313, 61/151,196 and 61/151,510, filed on Jan. 29, 2009, Feb. 1, 2009, Feb. 2, 2009, Feb. 10, 2009 and Feb. 11, 2009, respectively, which are hereby incorporated by reference as if fully set forth herein.

This application claims the benefit of Korean Patent Application No. 10-2009-0115861, filed on Nov. 27, 2009, which is hereby incorporated by reference as if fully set forth herein.

BACKGROUND OF THE INVENTION

1. Field of the Invention

The following description relates to a mobile communication system, and more particularly, to a method for setting a scheduling information triggering condition for efficiently managing a common Enhanced Dedicated Channel (E-DCH).

2. Discussion of the Related Art

First, a Universal Mobile Telecommunications System (UMTS) to which the present invention is applied is described as follows.

Figure 1:
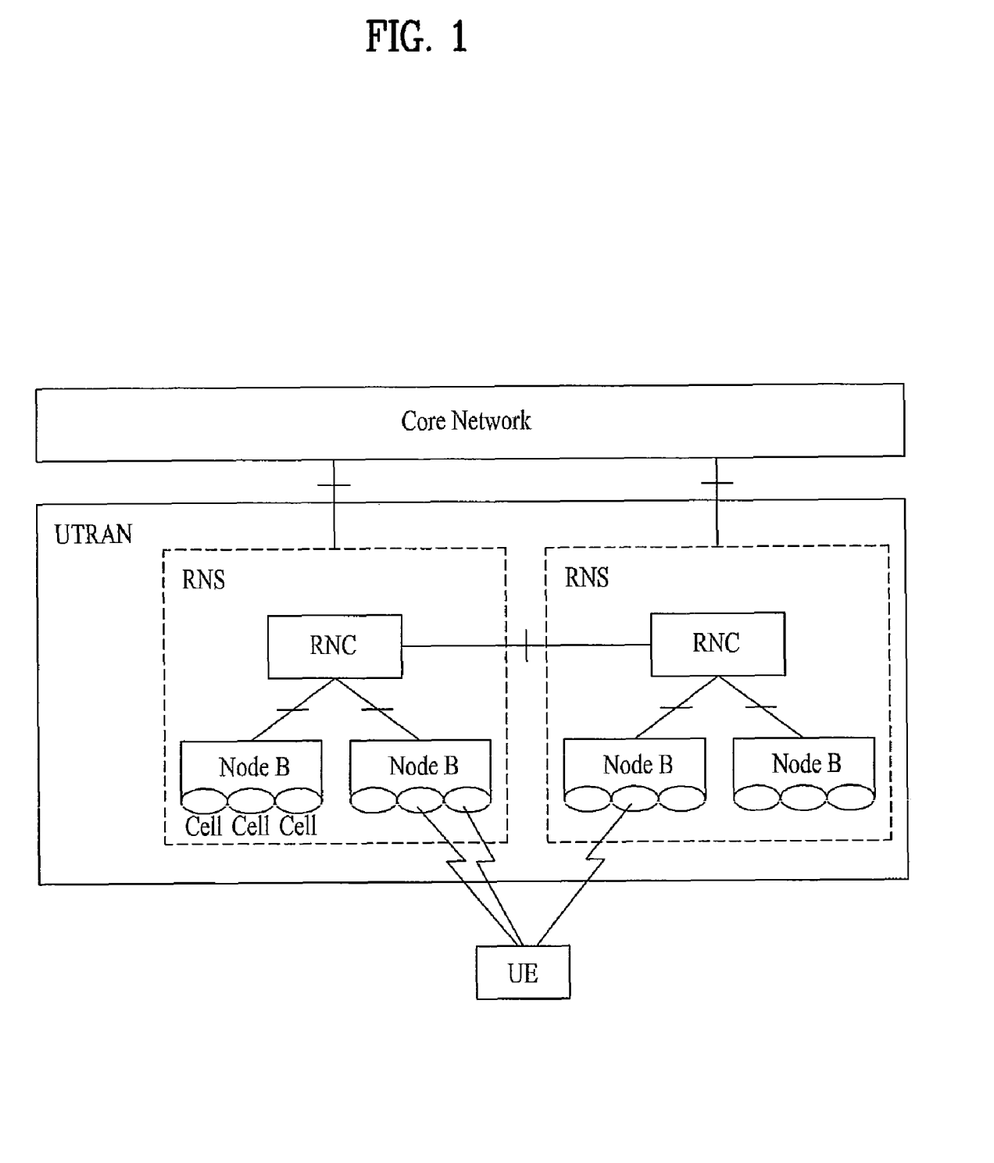
FIG. 1 illustrates a network structure of the UMTS.

FIG. 1 illustrates a network structure of the UMTS.

The UMTS system mainly includes a User Equipment (UE), a UMTS Terrestrial Radio Access Network (UTRAN), and a Core Network (CN). The UTRAN includes one or more Radio Network Sub-systems (RNSs) and each RNS includes a Radio Network Controller (RNC) and one or more base stations (Node Bs) managed by the RNC. One Node B has one or more cells.

Figure 2:
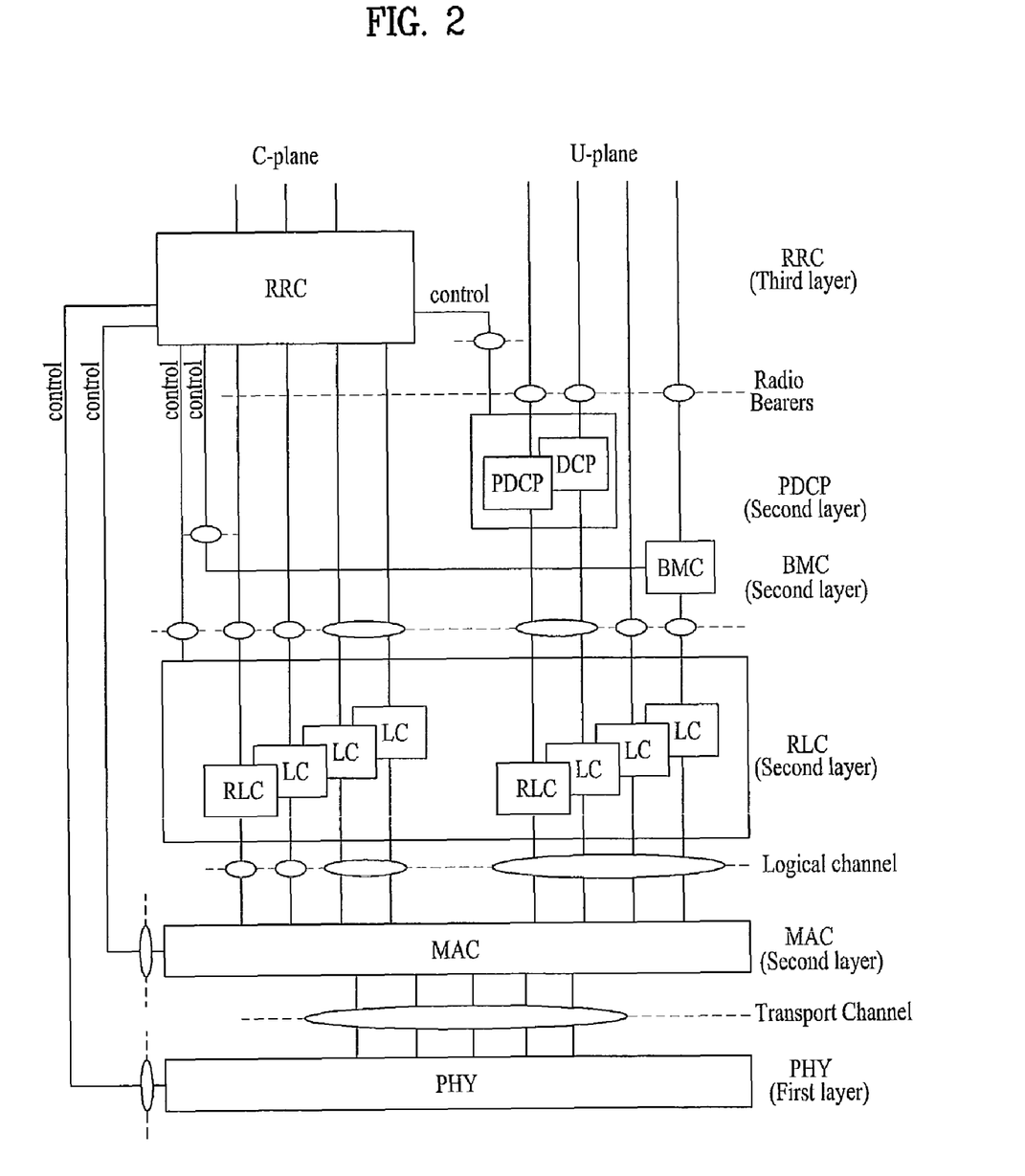
FIG. 2 illustrates a wireless (or radio) protocol structure used in the UMTS.

FIG. 2 illustrates a wireless (or radio) protocol structure used in the UMTS.

Pairs of wireless protocols, which are present in the UE and the UTRAN, are responsible for transmitting data in wireless intervals. Each wireless protocol layer will now be described. First, a physical (PHY) layer, which is the first layer, functions to transmit data in a wireless interval using various wireless transmission technologies. The PHY layer is responsible for reliable data transmission in wireless intervals. The PHY layer is connected to a MAC layer, which is a higher layer, through a transport channel. The transport channel is classified into a dedicated transport channel and a common transport channel according to whether the channel is shared or not.

The second layer includes Medium Access Control (MAC), Radio Link Control (RLC), Packet Data Convergence Protocol (PDCP), and Broadcast/Multicast Control (BMC) layers. The MAC layer is responsible for mapping various logical channels to various transport channels and is also responsible for logical channel multiplexing to map various logical channels to a single transport channel. The MAC layer is connected to the RLC layer, which is a higher layer, through a logical channel. The logical channel is mainly classified into a control channel used to transmit control plane information and a traffic channel used to transmit user plane information, according to the type of transmitted information.

The MAC layer is further classified into a MAC-b sublayer, a MAC-d sublayer, a MAC-c/sh sublayer, a MAC-hs/ehs sublayer, and a MAC-e/es or MAC-i/is sublayer, according to the type of managed transport channel. The MAC-b sublayer is responsible for managing a broadcast channel (BCH) which is a transport channel responsible for broadcasting system information. The MAC-c/sh sublayer is responsible for managing a common transport channel such as a forward access channel (FACH) which is shared with other UEs. The MAC-d sublayer is responsible for managing a dedicated channel (DCH) or an enhanced dedicated channel (E-DCH) which is a transport channel dedicated to a specific UE. In order to support high-speed uplink and downlink data transmission, the MAC-hs/ehs sublayer manages a high-speed downlink shared channel (HS-DSCH) which is a transport channel for high-speed downlink data transmission and the MAC-e/es or MAC-i/is sublayer manages an enhanced dedicated channel (E-DCH) which is a transport channel for high-speed uplink data transmission.

The RLC layer is responsible for guaranteeing a QoS of each radio bearer (RB) and transmitting data according to the QoS. The RLC has one or two independent RLC entities for each RB in order to guarantee the inherent QoS of the RB and provides three modes, a transparent mode (TM), an unacknowledged mode (UM), and an acknowledged mode (AM), in order to support various QoSs. The RLC serves to adjust the size of data so as to be suitable for a lower layer to transmit the data in a wireless interval. To accomplish this, the RLC also functions to split and connect data received from a higher layer.

The PDCP layer, which is located above the RLC layer, allows data to be efficiently transmitted in a wireless interval with a relatively small bandwidth using an IP packet such as IPv4 or IPv6. To accomplish this, the PDCP layer performs a header compression function which allows only indispensable information to be transmitted in a data header, thereby increasing the efficiency of transmission in wireless intervals. The PDCP layer is present mainly in the PS domain since the header compression is a basic function. One PDCP entity is present for each RB in order to provide an efficient header compression function for each PS service. The PDCP layer does not provide the header compression function when it is present in the CS domain.

The second layer also includes a broadcast/multicast control (BMC) layer above the RLC layer. The BMC layer functions to schedule cell broadcast messages and to perform broadcasting to UEs located in a specific cell.

The Radio Resource Control (RRC) layer, which is located at the bottom of the third layer, is defined only in the control plane. The RRC layer is responsible for controlling first and second layer parameters in association with setup, reset, and release of RBs and for controlling logical, transport, and physical channels. The RB is a logical path that the first and second layers of the wireless protocol provide for data transfer between the UE and the UTRAN. Setup of an RB is generally a process for defining characteristics of wireless protocol layers and channels required to provide a specific service and for setting their respective specific parameters and operating methods.

The following is a more detailed description of the E-DCH.

The E-DCH is a transport channel dedicated to a single UE which is used to transmit uplink data to a Node B in the UTRAN. In order to transmit data at a high rate, the E-DCH uses technologies such as Hybrid ARQ (HARQ), Adaptive Modulation and Coding (AMC), and Node B controlled scheduling.

For the E-DCH, the Node B transmits downlink control information, which controls E-DCH transmission of the UE, to the UE. The downlink control information includes acknowledgement information (ACK/NACK) for HARQ, channel quality information for AMC, and E-DCH transmission power allocation information for Node B controlled scheduling, or the like.

On the other hand, the UE transmits uplink control information to the Node B. The uplink control information includes E-DCH UE buffer status information for Node B controlled scheduling, UE power status information, the size of payload indicated by an E-TFCI, retransmission count, UE power surplus status report, or the like.

E-DCH transmission of the UE is controlled by the Node B. The E-DCH control of the Node B is performed by a scheduler which is responsible for allocating optimal radio resources to each UE. Specifically, the scheduler allocates a large amount of radio resources to a UE that is in a good radio channel condition and allocates a small amount of radio resources to a UE that is in a bad radio channel condition so as to reduce interference in the uplink radio channel.

The scheduler allocates radio resources taking into consideration not only the radio channel condition of the UE but also information such as the amount of available power that the UE can use for the E-DCH or the amount of data that the UE desires to transmit. That is, the scheduler allocates optimal radio resources to a UE, which has remaining power for the E-DCH and also has data for transmission in uplink, taking into consideration the radio channel condition.

Accordingly, to transmit data through the E-DCH, first, the UE notifies the Node B of the amount of power available to the UE and the amount of data for transmission. The amount of available power and the amount of data for transmission of the UE are transmitted through Scheduling Information (SI), a detailed structure of which is illustrated in FIG. 3.

Figure 3:
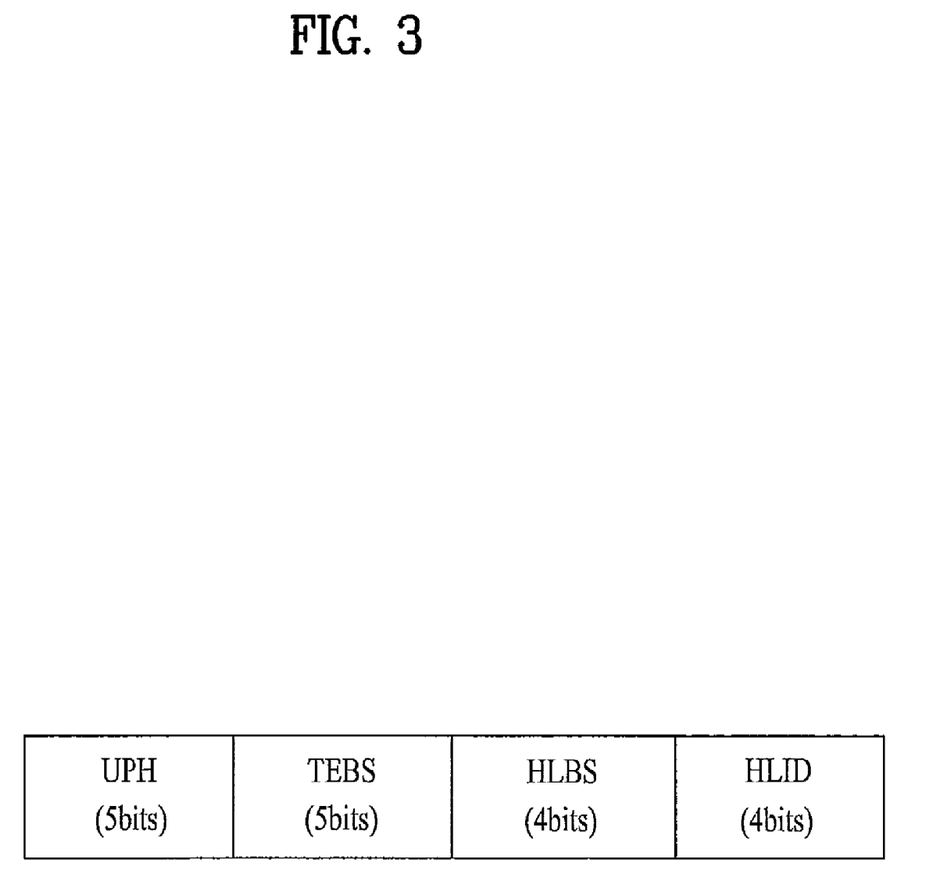
FIG. 3 illustrates a structure of scheduling information.

FIG. 3 illustrates a structure of the scheduling information.

The following is a description of parameters included in the scheduling information as shown in FIG. 3.

UE Power Headroom (UPH) indicates the ratio of the amount of power that the UE currently uses to the maximum amount of power available to the UE and thus indicates the amount of available power that the UE can use for the E-DCH.

Total E-DCH Buffer Status (TEBS) indicates, in bytes, the total amount of data of the UE awaiting transmission in the RLC and MAC layers. TEES indicates the total amount of data using an index in the range of 0 to 31 as illustrated in the following Table 1.

TABLE 1

| Index | TEBS value (bytes) |
|---|---|
| 0 | TEBS = 0 |
| 1 | 0 < TEBS = 10 |
| 2 | 10 < TEBS = 14 |
| 3 | 14 < TEBS = 18 |
| 4 | 18 < TEBS = 24 |
| ... | ... |
| 30 | 28339 < TEBS = 37642 |
| 31 | 37642 < TEBS |

For example, the TEBS is set to 0 (TEBS=0) if the total amount of data of the UE awaiting transmission is 0 byte and is set to 29 (TEBS=29) if the total amount of data is 29 bytes.

Highest priority Logical channel Buffer Status (HLBS) indicates the ratio of the amount of data of a highest priority logical channel to the total amount of UE data for transmission. Specifically, the HLBS indicates an index corresponding to 100×(the amount of highest priority logical channel data/the total amount of UE data for transmission).

Highest priority Logical channel ID (HLID) indicates the highest priority logical channel among logical channels having data for transmission.

The UE should transmit the scheduling information only in a specific condition for efficient use of radio resources instead of transmitting the scheduling information each time. To accomplish this, 3GPP currently defines the following conditions for triggering generation of scheduling information.

TABLE 2

Scheduling information Triggering Conditions when new data for transmission is generated in UE.
when data for transmission is generated in logical channel with higher priority than logical channel in which data awaiting transmission is present.
when HARQ transmission of MAC PDU including data and scheduling information has failed.
when a predetermined time is reached at regular intervals.

When scheduling information is generated when one of the triggering conditions is satisfied, the UE transmits a Medium Access Control Packet Data Unit (MAC PDU) including the scheduling information to the Node B. The MAC PDU generally includes higher-layer data and scheduling information. The MAC PDU may include scheduling information alone when higher-layer data is absent. The generated MAC PDU is transmitted to the Node B through a HARQ process in the MAC layer.

If the UE notifies the Node B of UE power and data status through scheduling information, the scheduler of the Node B determines the amount of power available to the UE for E-DCH transmission taking into consideration the status of the UE and the entire radio status of the cell and notifies the UE of the determined amount of available power through a downlink control signal. The downlink control signal notifying the UE of the amount of power is classified into two types, an Absolute Grant (AG) indicating an absolute value of the amount of power available to the UE and a Relative Grant (RG) indicating a value of the amount of power available to the UE relative to the amount of previously used power. Upon receiving the AG or RG downlink control signal, the UE determines the amount of power for use in E-DCH transmission and determines the size of a MAC PDU for transmission according to the determined amount of power.

On the other hand, the 3GPP standard defines a common Enhanced Dedicated Channel (common E-DCH) to allow a number of UEs to commonly use the E-DCH under control of the Node B.

SUMMARY OF THE INVENTION

There is a need to increase the efficiency of processes of the UE and to efficiently reduce unnecessary waste of resources when transmitting scheduling information for the common E-DCH.

Accordingly, the present invention is directed to a signal transmission scheme for efficient management of a common E-DCH that substantially obviates one or more problems due to limitations and disadvantages of the related art.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for transmitting signals to a Node B by a User Equipment (UE) using a Hybrid Automatic Repeat Request (HARQ) scheme includes transmitting a Medium Access Control Protocol Data Unit (MAC PDU) including first scheduling information and data to the Node B, determining whether or not a Total E-DCH Buffer Status (TEBS) field of the first scheduling information is set to 0 when the transmission of the MAC PDU has failed, triggering second scheduling information as new scheduling information when the TEBS field of the first scheduling information is not set to 0, and transmitting the second scheduling information to the Node B.

Here, the UE may use a common Enhanced Dedicated Channel (E-DCH) within a limited period of time and resources for the common E-DCH may be shared with a plurality of UEs in an idle mode and a CELL_FACH state.

The method may further include releasing the resources for the common E-DCH when the transmission of the MAC PDU has failed and the step of transmitting the second scheduling information may includes performing random access to the Node B, and generating a MAC PDU including the second scheduling information and transmitting the MAC PDU including the second scheduling information to the Node B.

In addition, the step of determining whether or not a Total E-DCH Buffer Status (TEBS) field of the first scheduling information is set to 0 may include determining whether or not the UE is in a CELL-FACH state or an idle mode, and the second scheduling information may be triggered when the TEBS field of the first scheduling information is not set to 0 or when the UE is neither in a CELL-FACH state nor in an idle mode.

Further, the second scheduling information may not be triggered when the transmission of the MAC PDU has failed and the TEBS field of the first scheduling information has been set to 0 and the UE is in a CELL_FACH state or an idle mode.

In another aspect of the present invention, a User Equipment (UE) for transmitting signals to a Node B using a Hybrid Automatic Repeat Request (HARQ) scheme includes a HARQ entity for managing one or more HARQ processes and controlling HARQ transmission of signals to the Node B, and a transmission module for transmitting a Medium Access Control Protocol Data Unit (MAC PDU) including first scheduling information and data to the Node B in association with a specific one of the one or more HARQ processes, wherein the HARQ entity determines whether or not a Total E-DCH Buffer Status (TEBS) field of the first scheduling information is set to 0 when the transmission of the MAC PDU has failed and triggers second scheduling information as new scheduling information when the TEBS field of the first scheduling information is not set to 0, and transmits the second scheduling information to the Node B through the transmission module.

In this embodiment, the UE is preferably designed to use a common Enhanced Dedicated Channel (E-DCH) within a limited period of time and resources for the common E-DCH may be shared with a plurality of UEs in an idle mode and a CELL_FACH state.

The UE may be designed to release the resources for the common E-DCH if the specific HARQ process has failed to transmit the MAC PDU and the UE may be designed to perform random access to the Node B and to generate and transmit a MAC PDU including the second scheduling information to the Node B in order to transmit the second scheduling information to the Node B.

In addition, the HARQ entity may be designed to additionally determine, when determining whether or not a Total E-DCH Buffer Status (TEBS) field of the first scheduling information is set to 0, whether or not the UE is in a CELL-FACH state or an idle mode, and to trigger the second scheduling information when the TEES field of the first scheduling information is not set to 0 or when the UE is neither in a CELL-FACH state or in an idle mode.

Further, the HARQ entity may be designed not to trigger the second scheduling information when the specific HARQ process has failed to transmit the MAC PDU and the TEBS field of the first scheduling information has been set to 0 and the UE is in a CELL_FACH state or an idle mode.

According to embodiments of the present invention, the UE does not transmit new scheduling information requesting release of radio resources, which have already been released, when HARQ transmission has failed, thereby avoiding unnecessary transmission of scheduling information of the UE and unnecessary resource allocation of the network.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention.

The following detailed description includes specific details in order to provide a thorough understanding of the present invention. However, it will be apparent to those skilled in the art that the present invention may be practiced without such specific details. For example, although the following descriptions will be given in detail with reference to the case where the mobile communication system is a 3GPP system, the following descriptions, except those specific to 3GPP, may be applied to any other mobile communication system.

In some instances, known structures and devices are omitted or are shown in block diagram form, focusing on important features of the structures and devices, so as not to obscure the concept of the present invention. The same reference numbers will be used throughout this specification to refer to the same or like parts.

In the following description, the term "terminal" is used to describe any mobile or stationary user device such as a User Equipment (UE) or a Mobile Station (MS). In addition, the term "base station" is used to describe any network node that communicates with the terminal such as a Node B or an eNode B.

The following is a description of a common E-DCH to which the present invention is applied.

An E-DCH is classified into a dedicated E-DCH that is occupied by a specific UE and a common E-DCH that is shared by a number of terminals (UEs). While the dedicated E-DCH is a transport channel that is allocated only to a specific UE, the common E-DCH is commonly allocated to a number of UEs under control of a base station (Node B).

Radio resources of the common E-DCH are used only by UEs that are in an idle mode or in a CELL_FACH status. The idle mode is a state in which the UE is not connected to the network and the CELL_FACH status is a state in which no dedicated channel is allocated to the UE since the amount of data to be transmitted is small although the UE is connected to the network. A common E-DCH has been developed to enable UEs in the two states to perform high-speed data transmission since no dedicated channels have been allocated to UEs in the two states. Each UE should perform a random access procedure when requesting allocation of radio resources of a common E-DCH since multiple UEs may simultaneously attempt to use the common E-DCH. An embodiment of the present invention suggests that the Node B provide time information to a UE when allocating common E-DCH radio resources to the UE to allow the UE to use the radio resources only within a predetermined period of time.

When common E-DCH radio resources are allocated to a UE according to this embodiment, the UE uses the common E-DCH radio resources only within a predetermined period of time and releases, when the predetermined period of time has expired, the common E-DCH radio resources to allow another UE to use the released common E-DCH radio resources. However, if the UE completes data transmission before the predetermined period of time expires, the UE may notify the Node B of the release of the common E-DCH radio resources. Scheduling information of TEBS=0 is transmitted to notify the Node B of the release of the common E-DCH radio resources. When receiving the scheduling information of TEBS=0, the Node B may release the common E-DCH radio resources of the UE before the predetermined period of time expires since TEBS=0 indicates that the UE has no data for transmission.

Figure 4:
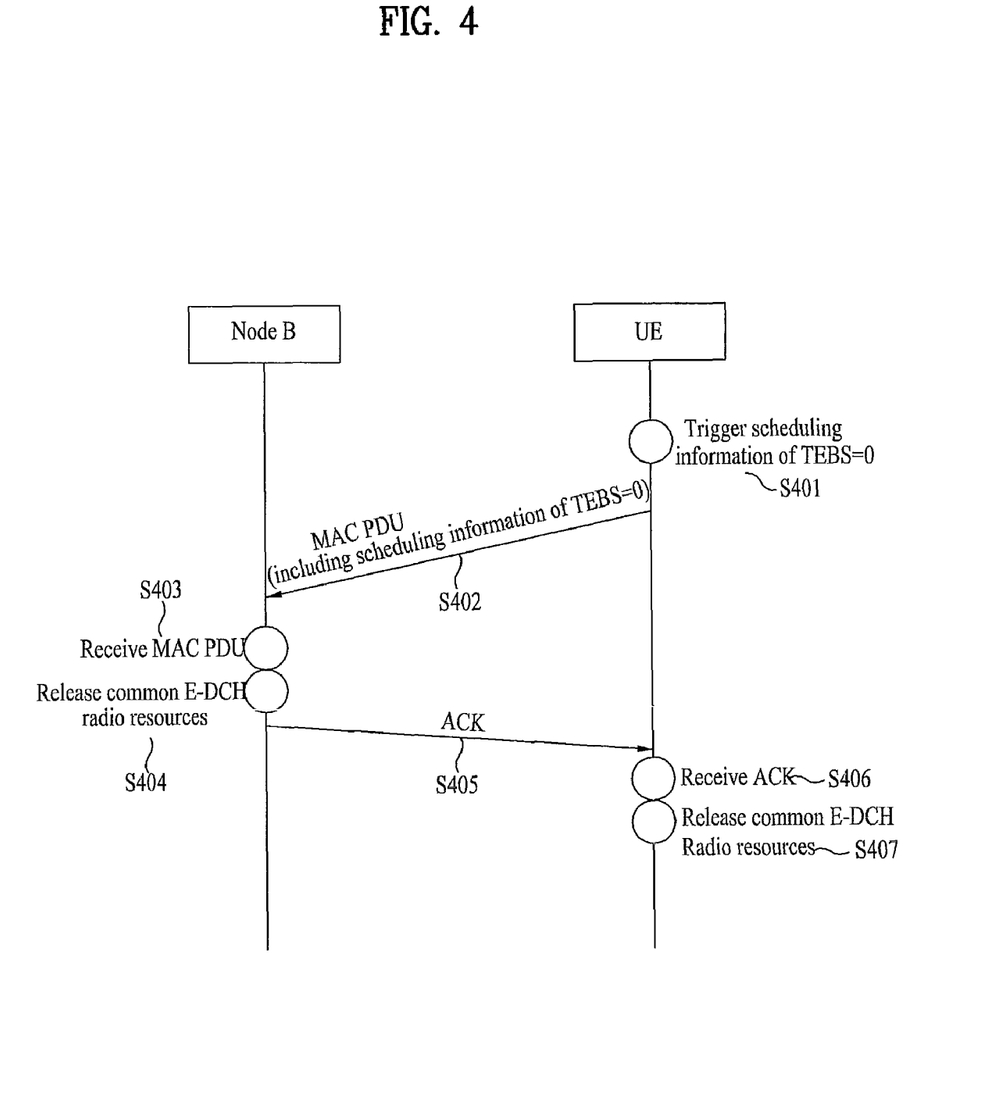
FIG. 4 illustrates a procedure for releasing common E-DCH radio resources through scheduling information of TEBS=0.

FIG. 4 illustrates a procedure for releasing common E-DCH radio resources through scheduling information of TEBS=0.

When a UE releases radio resources before a predetermined period of time expires, the UE may generate scheduling information of TEBS=0 (S401). Specifically, TEBS indicates data for transmission/retransmission in an RLC buffer or remaining data in a MAC buffer. Accordingly, when SI of TEBS=0 is triggered, a MAC PDU transmitted with the SI of TEBS=0 includes the last data present in the buffer. Thus, if the MAC PDU is transmitted, then all buffers of the UE are empty.

Accordingly, the UE may transmit a MAC PDU including the last data present in the UE buffer for transmission together with the scheduling information generated as described above to the Node B (S402). Transmission of the MAC PDU is performed through a specific HARQ that is managed by a HARQ entity. The UE releases the common E-DCH radio resources after waiting until HARQ transmission of the generated MAC PDU is completed such that it is flushed (i.e., removed) from the HARQ buffer.

For example, the MAC PDU transmitted as described above may be received by the Node B (S403). Upon receiving the MAC PDU including the scheduling information of TEBS=0 from the UE, the Node B may release the common E-DCH radio resources in response to the reception (S404). Thereafter, the Node B may transmit a positive acknowledgement (ACK) to the MAC PDU received from the UE (S405).

Upon receiving the ACK from the Node B (S406), the UE may flush data of the HARQ buffer corresponding to the HARQ process that is used for transmission of the MAC PDU at step S402 in response to the ACK reception and may then release the common E-DCH radio resources accordingly (S407).

The UE may flush the MAC PDU from the HARQ buffer in two cases. The UE flushes the MAC PDU from the Node B when an ACK has been received from the Node B since transmission of the MAC PDU is successful as shown in FIG. 4. On the other hand, the UE may determine that HARQ transmission of the MAC PDU has failed and flush the MAC PDU from the HARQ buffer if transmission of the MAC PDU is unsuccessful (i.e., no ACK is received from the Node B) although the UE has transmitted the MAC PDU the maximum number of times of retransmission.

If HARQ transmission has failed after the UE transmitted a MAC PDU including the last data present in the UE buffer and scheduling information of TEBS=0 in order to release common E-DCH radio resources, the UE may release the common E-DCH radio resources when the MAC PDU is flushed from the HARQ buffer, regardless of whether or not transmission of the MAC PDU is successful. In this case, the UE releases the common E-DCH radio resources without further transmission in order to reduce waste of radio resources since the Node B may have actually received the MAC PDU (when an ACK has been lost) or may not have received the MAC PDU (when transmission of the MAC PDU has failed).

However, the UE needs to trigger new scheduling information when the UE has failed to perform HARQ transmission of a MAC PDU including data and scheduling information, according to the triggering condition of current scheduling information described above with reference to Table 2. The same is true when the MAC PDU includes information of TEBS=0 indicating release of common E-DCH radio resources. In this case, the UE needs to trigger new scheduling information although the UE does not have any further data for transmission. This procedure is described below in detail with reference to FIG. 5.

Figure 5:
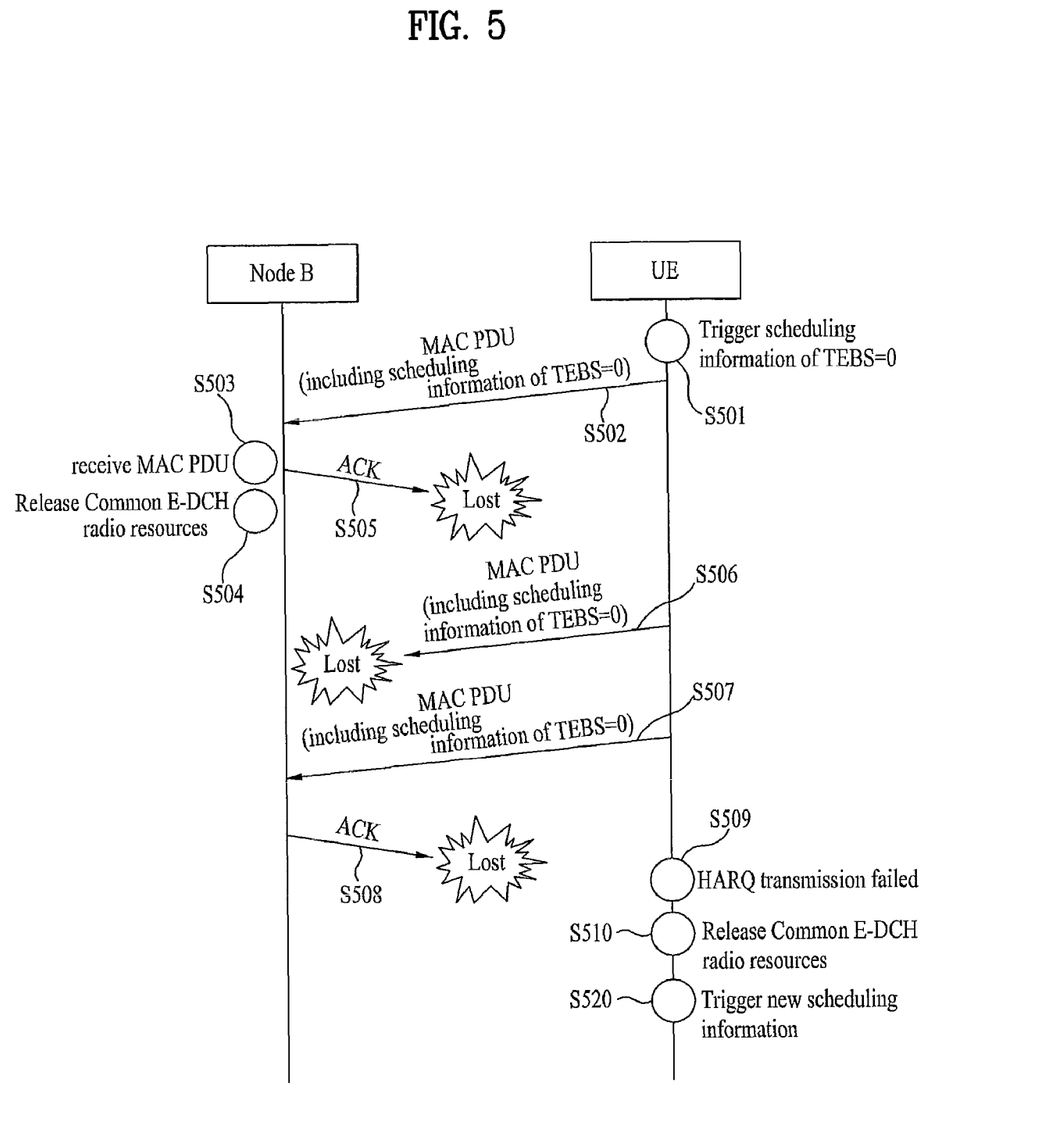
FIG. 5 illustrates a problem associated with a condition for triggering scheduling information associated with a common E-DCH.

FIG. 5 illustrates a problem associated with a condition for triggering scheduling information associated with a common E-DCH.

When a UE, which is in a CELL_FACH status or in an idle mode in which the UE uses a common E-DCH within a limited period of time, has no data in an RLC transmission or retransmission buffer or has no data in a MAC transmission buffer, the UE may trigger scheduling information of TEBS=0 in order to notify a Node B of release of radio resources of the common E-DCH (S501). Accordingly, the UE may transmit a MAC PDU including higher layer data and scheduling information of TEBS=0 to the Node B (S502). Upon receiving the MAC PDU transmitted by the UE (S503), the Node B may release the common E-DCH radio resources in response to the reception (S504). The Node B may transmit an ACK to the UE in order to notify the UE of successful reception of the MAC PDU (S505).

On the other hand, the UE may fail to receive the ACK transmitted by the Node B as shown in FIG. 5. When the UE has failed to receive the ACK, the UE may retransmit the MAC PDU until the maximum HARQ transmission count is reached (S506 and S507). However, the UE determines that the HARQ transmission has failed and clears the HARQ buffer (S509) when the maximum HARQ triggering count of the UE is reached because the MAC PDU transmitted by the UE is not received by the Node B as illustrated at step S506 in FIG. 5 or because a corresponding ACK transmitted by the Node B (S508) is not received by the UE although the MAC PDU has been successfully received by the Node B as illustrated at step S507. When HARQ transmission has failed in this manner, the UE also releases the common E-DCH radio resources as described above (S510). In this case, the UE should trigger new scheduling information even though the UE has no data for transmission since HARQ transmission of data and scheduling information has failed according to the current scheduling information triggering condition described above with reference to Table 2 (S520). In addition, the UE should perform a new random access procedure for transmission of new scheduling information since the common E-DCH radio resources have already been released. However, this causes unnecessary battery consumption of the UE and unnecessary allocation of common E-DCH radio resources of the Node B.

In summary, the scheduling information triggering condition described in Table 2 has a problem in that the UE not only releases common E-DCH radio resource but also triggers new scheduling information when the UE has failed to perform HARQ transmission of a MAC PDU including TEBS=0 indicating release of the common E-DCH radio resources. In this case, in order to transmit TEBS=0 alone, the UE should perform a new random access procedure to acquire common E-DCH radio resources since the common E-DCH radio resources have already been released.

Accordingly, a preferred embodiment of the present invention suggests that, when a UE has failed to perform HARQ transmission of scheduling information, the UE not immediately trigger new scheduling information but additionally determine whether or not TEBS of the scheduling information, HARQ transmission of which has failed, is set to "0", thereby solving the above problem.

Specifically, this embodiment suggests that the UE trigger new scheduling information and transmit the same to the Node B only when TEBS of the scheduling information, HARQ transmission of which has failed, is not to set "0".

Figure 6:
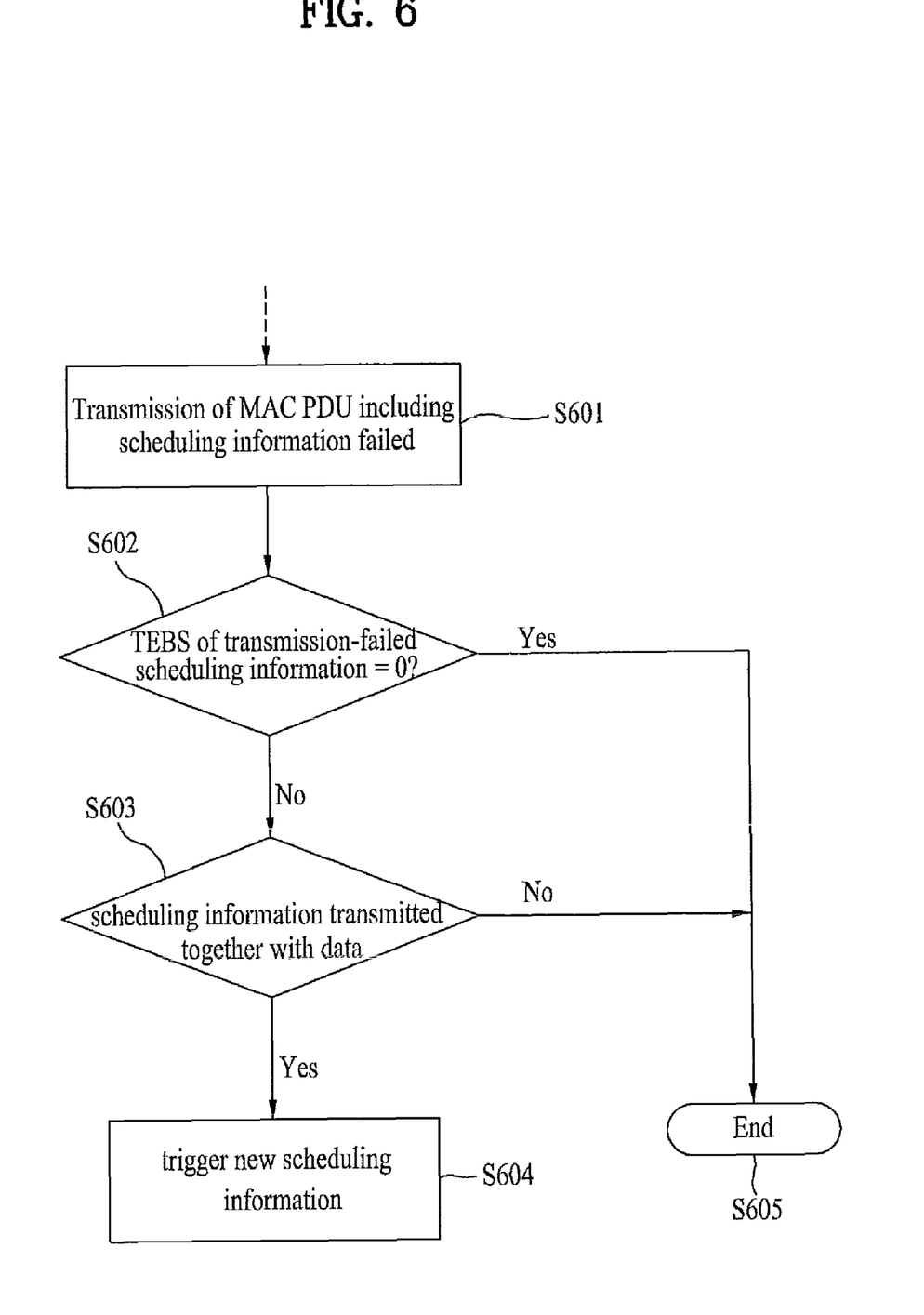
FIG. 6 illustrates a method for triggering scheduling information according to a preferred embodiment of the present invention.

FIG. 6 illustrates a method for triggering scheduling information according to a preferred embodiment of the present invention.

First, when a UE has transmitted scheduling information to a Node B according to a HARQ scheme, the UE may fail to transmit a MAC PDU due to failure of the Node B to receive the MAC PDU or failure of the UE to receive an ACK transmitted by the Node B (S601). This embodiment suggests that, when such a scheduling information transmission failure has occurred, the UE not immediately trigger new scheduling information but additionally check a TEBS field of the scheduling information that has failed to be transmitted to determine whether or not the TEBS of the scheduling information is set to "0" (S602). When the TEBS of the scheduling information that has failed to be transmitted is set to "0" (i.e., TEBS=0), the UE no longer triggers scheduling information (S605). That is, the UE according to this embodiment may trigger new scheduling information only when the TEBS of the scheduling information that has failed to be transmitted is not set to "0".

Specifically, when the TEBS of the scheduling information that has failed to be transmitted is not set to "0", the UE may determine whether or not the scheduling information has been transmitted together with data through a MAC PDU (S603). When it is determined that the scheduling information has been transmitted without data through a MAC PDU (i.e., a stand alone type MAC PDU), the UE may no longer trigger scheduling information (S605). When transmission of a MAC PDU including the scheduling information alone (i.e., without data) has failed in this manner, the UE can transmit scheduling information required for the next scheduling information transmission period based on period scheduling.

On the other hand, when it is determined at step S603 that the scheduling information, HARQ transmission of which has failed, has been transmitted together with data through a MAC PDU, the UE triggers new scheduling information (S604). Accordingly, the UE can transmit both the newly triggered scheduling information and the data through the MAC PDU to the Node B.

The following is a description of the case where a common E-DCH is used using the scheduling information triggering condition suggested as described above in comparison with the case where a common E-DCH is used according to the conventional scheduling scheme.

FIGS. 7A and 7B illustrate operations of a UE in an idle mode or in a CELL_FACH status that uses a common E-DCH according to an embodiment of the present invention.

FIG. 7A illustrates the case of using a general scheduling information triggering condition and FIG. 7B illustrates the case of using the scheduling information triggering condition according to the embodiment described above with reference to FIG. 6.

Figure 7:
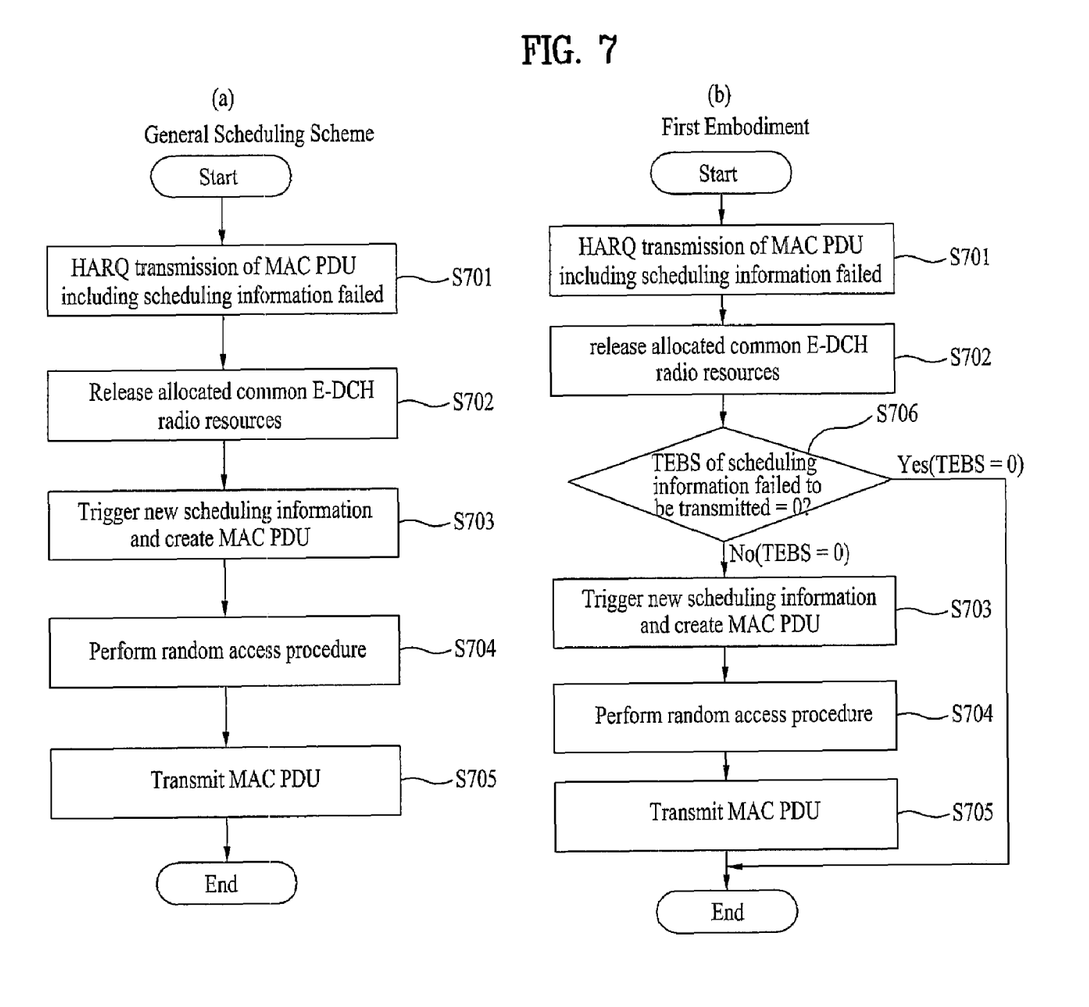
FIGS. 7A and 7B illustrate operations of a UE in an idle mode or in a CELL_FACH status that uses a common E-DCH according to an embodiment of the present invention.

First, when a UE, which is in a CELL_FACH status or in an idle mode in which the UE uses a common E-DCH within a limited period of time, transmits last data, the UE may transmit a MAC PDU including the last data and scheduling information of TEBS=0 to a Node B. In FIG. 7, it is assumed that the UE has failed to transmit the MAC PDU (S701). When the UE has transmitted scheduling information of TEBS=0 in order to notify the Node B of release of common E-DCH radio resources in this manner, the UE may also release the common E-DCH radio resources as described above with reference to FIGS. 4 and 5 (S702).

In the case where the general scheduling information triggering scheme is employed as shown in FIG. 7A, the UE triggers new scheduling information when HARQ transmission of scheduling information together with data has failed and creates a MAC PDU for transmitting the new scheduling information (S703). However, the UE has no radio resources for transmitting the triggered scheduling information since radio resources for common E-DCH transmission have already been released. Accordingly, the UE transmits the created MAC PDU (S705) after performing a procedure for random access to the Node B (S704) and acquiring uplink radio resources from the Node B. However, retransmission of the scheduling information from the UE causes unnecessary battery consumption of the UE and unnecessary allocation of common E-DCH radio resources of the Node B since the purpose of retransmission of the scheduling information is only to notify the Node B of release of common E-DCH radio resources.

On the other hand, in the case where the embodiment of the present invention is employed as shown in FIG. 7B, the UE additionally determines whether or not TEBS of scheduling information is set to "0" when HARQ transmission of the scheduling information has failed at step S706. That is, this embodiment suggests that the UE perform an operation for transmitting new scheduling information according to the procedure of steps S703 to S705 only when the TEBS of the scheduling information, HARQ transmission of which has failed, is not "0" and not longer trigger scheduling information when the TEBS of the scheduling information, HARQ transmission of which has failed, is "0".

The purpose of determining whether or not the TEBS of the scheduling information is 0 at step S706 in FIG. 7 is to overcome the problem that may occur when the common E-DCH is used as shown in FIG. 5. Since the common E-DCH is used only by UEs that are in an idle mode or in a CELL_FACH status, the operation for transmitting new scheduling information according to the procedure of steps S703 to S705 may be performed when the UE is neither in an idle mode nor in a CELL_FACH status.

To overcome the problem illustrated in FIG. 5, another embodiment of the present invention suggests a method in which new scheduling information is triggered in the same manner as in the general scheme while the triggered scheduling information is not transmitted when TEBS of scheduling information, HARQ transmission of which has failed, is set to 0.

FIGS. 8A and 8B illustrate a method for operating a UE that uses a common E-DCH according to an embodiment of the present invention.

FIG. 8A illustrates a method for operating a UE that uses a general scheduling information triggering condition and FIG. 8B illustrates a method for operating a UE according to the embodiment.

Figure 8:
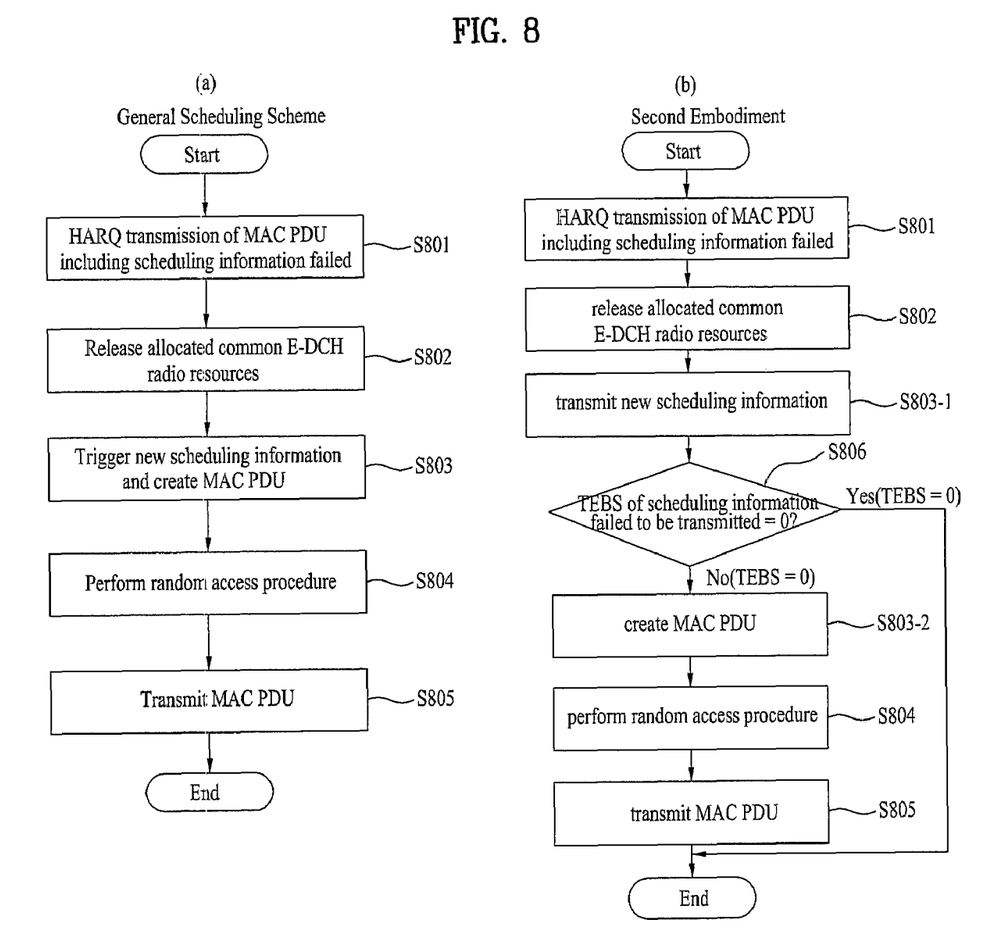
FIGS. 8A and 8B illustrate a method for operating a UE that uses a common E-DCH according to an embodiment of the present invention.

The operating method of FIG. 8A is similar to that of FIG. 7A. That is, when a UE, which is in a CELL_FACH status or in an idle mode in which the UE uses a common E-DCH within a limited period of time, has transmitted last data, the UE may transmit a MAC PDU including the last data and scheduling information of TEBS=0 to a Node B. In FIG. 8, it is assumed that the UE has failed to transmit the MAC PDU (S801). When the UE has transmitted scheduling information of TEBS=0 in order to notify the Node B of release of common E-DCH radio resources in this manner, the UE may also release the common E-DCH radio resources as described above with reference to FIGS. 4 and 5 (S802).

In the case where the general scheduling information triggering scheme is employed as shown in FIG. 8A, the UE triggers new scheduling information when HARQ transmission of scheduling information together with data has failed and creates a MAC PDU for transmitting the new scheduling information (S803). However, the UE has no radio resources for transmitting the triggered scheduling information since radio resources for common E-DCH transmission have already been released. Accordingly, the UE transmits the created MAC PDU (S805) after performing a procedure for random access to the Node B (S804) and acquiring uplink radio resources from the Node B. However, retransmission of the scheduling information from the UE causes unnecessary battery consumption of the UE and unnecessary allocation of common E-DCH radio resources of the Node B since the purpose of retransmission of the scheduling information is only to notify the Node B of release of common E-DCH radio resources.

On the other hand, in the case where this embodiment is employed as shown in FIG. 8B, the UE triggers new scheduling information according to a general scheduling information triggering algorithm when HARQ transmission of scheduling information has failed at step S803-1. However, instead of unconditionally creating and transmitting a MAC PDU for transmitting the triggered scheduling information to the Node B, the UE checks a TEBS field of the scheduling information, HARQ transmission of which has failed, to determine whether or not TEBS of the scheduling information, HARQ transmission of which has failed, is 0 (S806). This embodiment suggests that the UE not transmit the triggered scheduling information when the TEBS of the scheduling information, HARQ transmission of which has failed, is 0. On the other hand, when the TEBS of the scheduling information, HARQ transmission of which has failed, is not 0, the UE may create a MAC PDU for transmitting the scheduling information triggered at step S803-1 (S803-2) and perform subsequent operations for transmitting the created MAC PDU (S804 and S805).

The UE according to the embodiments described above can avoid unnecessary waste of resources and unnecessary operations when using the common E-DCH.

The following is a description of the configuration of a UE according to the embodiments described above.

In a mobile communication system, a UE may include an input unit, a display module, and the like in addition to a processor for signal processing. Among configurations of these components of the UE, process structures that are responsible for actual signal processing are mainly described below.

Figure 9:
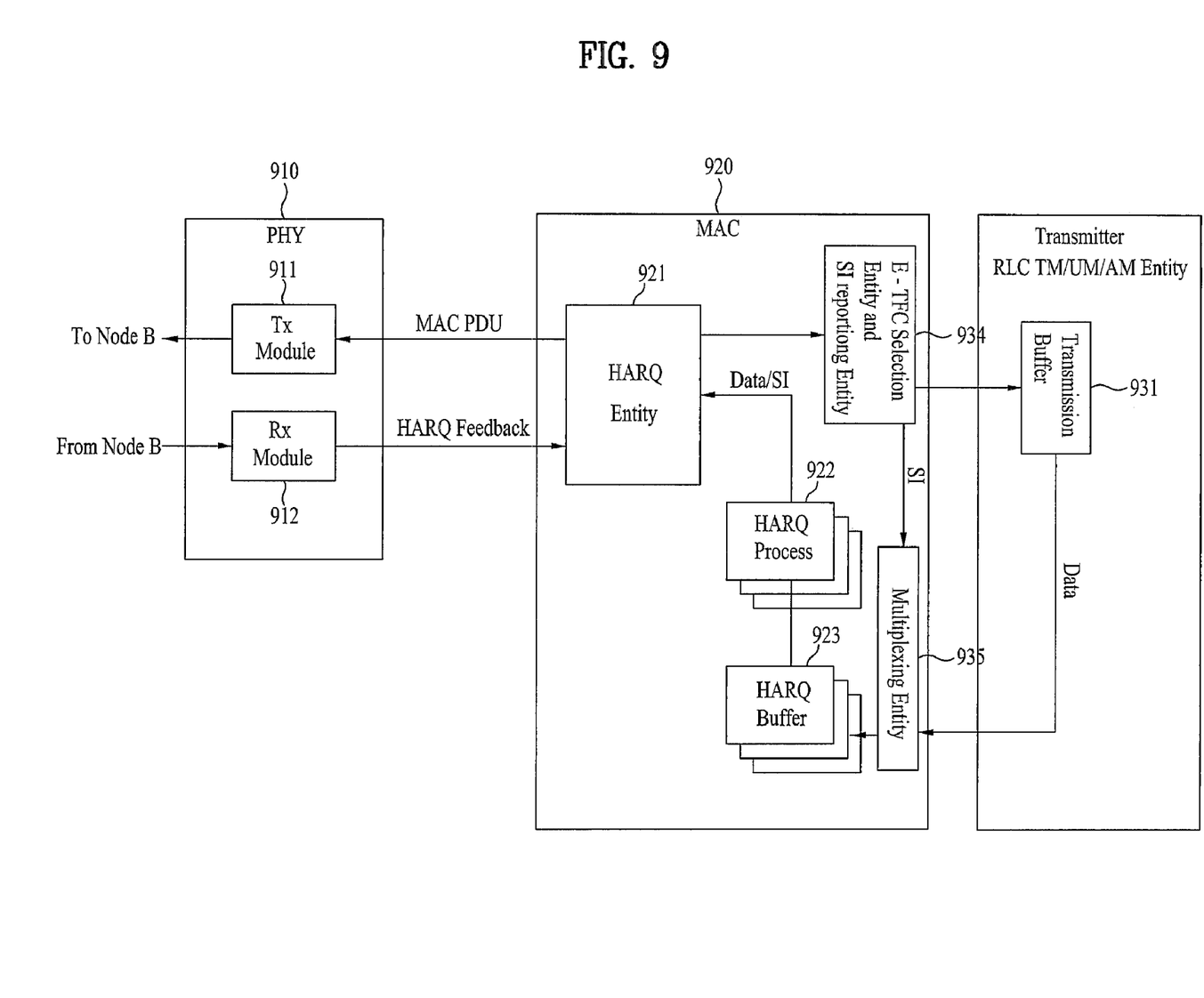
FIG. 9 illustrates a configuration of a processor of a UE according to an embodiment of the present invention.

FIG. 9 illustrates a configuration of a processor of a UE according to an embodiment of the present invention.

The processor of the UE may have the protocol structure as described above with reference to FIG. 2 and embodiments of the present invention are mainly associated with a physical layer 910, a MAC layer 920, and an RLC layer 930 among the layers of the protocol structure.

The MAC layer module 920 according to an embodiment of the present invention may include a HARQ entity 921, one or more HARQ processes 922, HARQ buffers 923 corresponding respectively to the HARQ processes 922, an E-TFC selection entity & SI reporting entity 924 that determines a MAC PDU size and transmission power when transmitting a new MAC PDU, and a multiplexing entity 925 that multiplexes scheduling information with data of a transmission buffer 931 of an RLC layer above the MAC layer which is transmitted every MAC-d flow. The UE includes one HARQ entity 921 which manages one or more HARQ processes 922 and manages HARQ signal transmission of the UE.

The physical layer module 910 may be simplified such that it includes a transmission module 911 and a reception module 912. The transmission module 911 may be responsible for transmitting a MAC PDU received from the MAC layer module to the Node B and the reception module 912 may be responsible for receiving a HARQ feedback signal from the Node B in response to the MAC PDU transmission from the UE.

The HARQ entity 921 of the UE may transmit a MAC PDU including data and scheduling information to the Node B, in association with a specific one of the one or more HARQ processes 922, through the transmission module 911 of the physical layer module 910. An embodiment of the present invention suggests that, when the specific HARQ process has failed to transmit the MAC PDU, the HARQ entity 921 of the UE (the E-TFC selection entity & SI reporting entity 924 in a more specific embodiment) determine whether or not a TEBS field of scheduling information, HARQ transmission of which has failed, is set to 011 and trigger new scheduling information only when the TEBS field is not set to "0" and transmit the triggered scheduling information to the Node B through the transmission module 911.

An embodiment of the present invention suggests that the HARQ entity 921 be designed to additionally determine whether or not the UE is in an idle mode or in a CELL_FACH status when determining whether or not the TEBS field of the scheduling information is set to "0" and the UE be designed to transmit the new scheduling information triggered in response to failure of the HARQ transmission of the scheduling information when the UE is neither in an idle mode nor in a CELL_FACH status.

As is apparent from the above description, the embodiments of the present invention avoid unnecessary transmission of scheduling information of a UE and unnecessary resource allocation of a network since the UE does not transmit new scheduling information requesting release of radio resources, which have already been released, when HARQ transmission has failed.

Although the signal transmission/reception technologies and the UE structures for accomplishing the technologies have been described above with reference to examples where they are applied to the 3GPP system, they may also be applied to various other types of mobile communication systems having similar procedures.

The detailed description of the preferred embodiments of the present invention has been given to enable those skilled in the art to implement and practice the invention. Although the invention has been described with reference to the preferred embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

What is claimed is:

1. A method for transmitting signals to a Node B by a User Equipment (UE) using a Hybrid Automatic Repeat Request (HARQ) scheme, the method comprising:
   transmitting a Medium Access Control Protocol Data Unit (MAC PDU) including first scheduling information and data to the Node B;
   determining whether or not a Total E-DCH Buffer Status (TEBS) field of the first scheduling information is set to 0 when the transmission of the MAC PDU has failed;
   initiating a transmission of second scheduling information as new scheduling information when the TEBS field of the first scheduling information is not set to 0; and
   transmitting the second scheduling information to the Node B.

2. The method of claim 1, wherein the UE uses a common Enhanced Dedicated Channel (E-DCH) within a limited period of time.

3. The method of claim 2, wherein resources for the common E-DCH are shared with a plurality of UEs in an idle mode and a CELL_FACH state.

4. The method of claim 3, further comprising:
   releasing the resources for the common E-DCH when a HARQ buffer of a HARQ process corresponding to the transmission of the MAC PDU is empty after the transmission of the MAC PDU.

5. The method of claim 4, wherein transmitting the second scheduling information comprises:
   performing random access to the Node B; and
   generating a MAC PDU including the second scheduling information and transmitting the MAC PDU including the second scheduling information to the Node B.

6. The method of claim 2, wherein determining whether or not a Total E-DCH Buffer Status (TEBS) field of the first scheduling information is set to 0 comprises determining whether or not the UE is in a CELL-FACH state or an idle mode, and
   wherein the transmission of the second scheduling information is initiated when the TEBS field of the first scheduling information is not set to 0 or when the UE is neither in a CELL-FACH state nor in an idle mode.

7. The method of claim 6, wherein the UE does not initiate the transmission of the second scheduling information when the TEBS field of the first scheduling information is set to 0 and the UE is in a CELL FACH state or an idle mode.

8. A User Equipment (UE) for transmitting signals to a Node B using a Hybrid Automatic Repeat Request (HARQ) scheme, the UE comprising:
   a HARQ entity for managing one or more HARQ processes and controlling HARQ transmission of signals to the Node B; and
   a transmission module for transmitting a Medium Access Control Protocol Data Unit (MAC PDU) including first scheduling information and data to the Node B in association with a specific one of the one or more HARQ processes, and
   wherein the HARQ entity determines whether or not a Total E-DCH Buffer Status (TEBS) field of the first scheduling information is set to 0 when the transmission of the MAC PDU has failed and initiates a transmission of second scheduling information as new scheduling information when the TEBS field of the first scheduling information is not set to 0, and transmits the second scheduling information to the Node B through the transmission module.

9. The UE of claim 8, wherein the UE is designed to use a common Enhanced Dedicated Channel (E-DCH) within a limited period of time.

10. The UE of claim 9, wherein resources for the common E-DCH are shared with a plurality of UEs in an idle mode and a CELL_FACH state.

11. The UE of claim 10, wherein the UE is designed to release the resources for the common E-DCH if the specific HARQ process has failed to transmit the MAC PDU when a HARQ buffer of a HARQ process corresponding to transmission of the MAC PDU is empty after the MAC PDU is transmitted.

12. The UE of claim 11, wherein the UE is designed to perform random access to the Node B and to generate and transmit a MAC PDU including the second scheduling information to the Node B in order to transmit the second scheduling information to the Node B.

13. The UE of claim 9, wherein the HARQ entity is designed to additionally determine, when determining whether or not a Total E-DCH Buffer Status (TEBS) field of the first scheduling information is set to 0, whether or not the UE is in a CELL-FACH state or an idle mode, and to initiate the transmission of the second scheduling information when the TEBS field of the first scheduling information is not set to 0 or when the UE is neither in a CELL-FACH state or in an idle mode.

14. The UE of claim 13, wherein the HARQ entity is designed not to initiate the transmission of the second scheduling information when the TEBS field of the first scheduling information is set to 0 and the UE is in a CELL_FACH state or an idle mode.

\* \* \* \* \*